Oct. 1, 1968 HIROSHI AMEMIYA 3,404,387

MEMORY SYSTEM HAVING IMPROVED ELECTRICAL TERMINATION OF CONDUCTORS

Filed Oct. 16, 1964 2 Sheets-Sheet 1

INVENTOR.
HIROSHI AMEMIYA
BY
Carl V. Olson
Attorney

INVENTOR.
HIROSHI AMEMIYA
BY
Carl V. Olson
Attorney

United States Patent Office
3,404,387
Patented Oct. 1, 1968

3,404,387
MEMORY SYSTEM HAVING IMPROVED ELECTRICAL TERMINATION OF CONDUCTORS
Hiroshi Amemiya, Willingboro, N.J., assignor to Radio Corporation of America, a corporation of Delaware
Filed Oct. 16, 1964, Ser. No. 404,430
6 Claims. (Cl. 340—174)

This invention relates to memory systems, such as magnetic memory systems, and particularly to memories in which successive cycles of operation each include a time period devoted to writing information and a time period devoted to reading information.

Individual memory elements are available which can very rapidly be switched between conditions representing the storage of "1" and "0" information bits. However, when a memory is constructed having a great many individual memory elements, it is found that the speed of operation of the memory in the alternate writing and reading of information is limited by noise disturbances in the memory. The writing of information into a memory results in electrical disturbances on the conductors in the memory which must be allowed to die down before information can be read out from the memory. The noise disturbances associated with the writing of information may have an initial amplitude on the sense winding of as much as four hundred times the amplitude of the desired information signals. Therefore, the writing of information must be followed by a waiting period during which the noise disturbances in the memory are allowed to die down sufficiently to permit reading of information from the memory.

The length of the waiting period between the writing and reading of information is determined to a great extent by the degree to which drive pulses and noise disturbances are reflected back and forth along the electrically-long conductors of the memory.

It is therefore a general object of this invention to provide an improved memory system in which reflections of electrical signals are substantially prevented so that the reading of information can occur at a shorter time following the writing of information.

In accordance with an example of the invention, there is provided a two-core-per-bit memory having a plurality of pairs of memory elements each located at crossovers of one of many word conductors and two conductors of many digit-sense conductor pairs. Each digit-sense conductor pair is coupled to digit write drivers and a differential sense amplifier. Terminal ends of the digit-sense conductor pairs are each connected to ground through a three-element, three-terinal T or $\pi$ resistor network. The resistor networks each include three resistors having values selected so that the network provides an energy dissipating termination for both differential-mode signals and common-mode signals.

Figures 1, 2, 3:
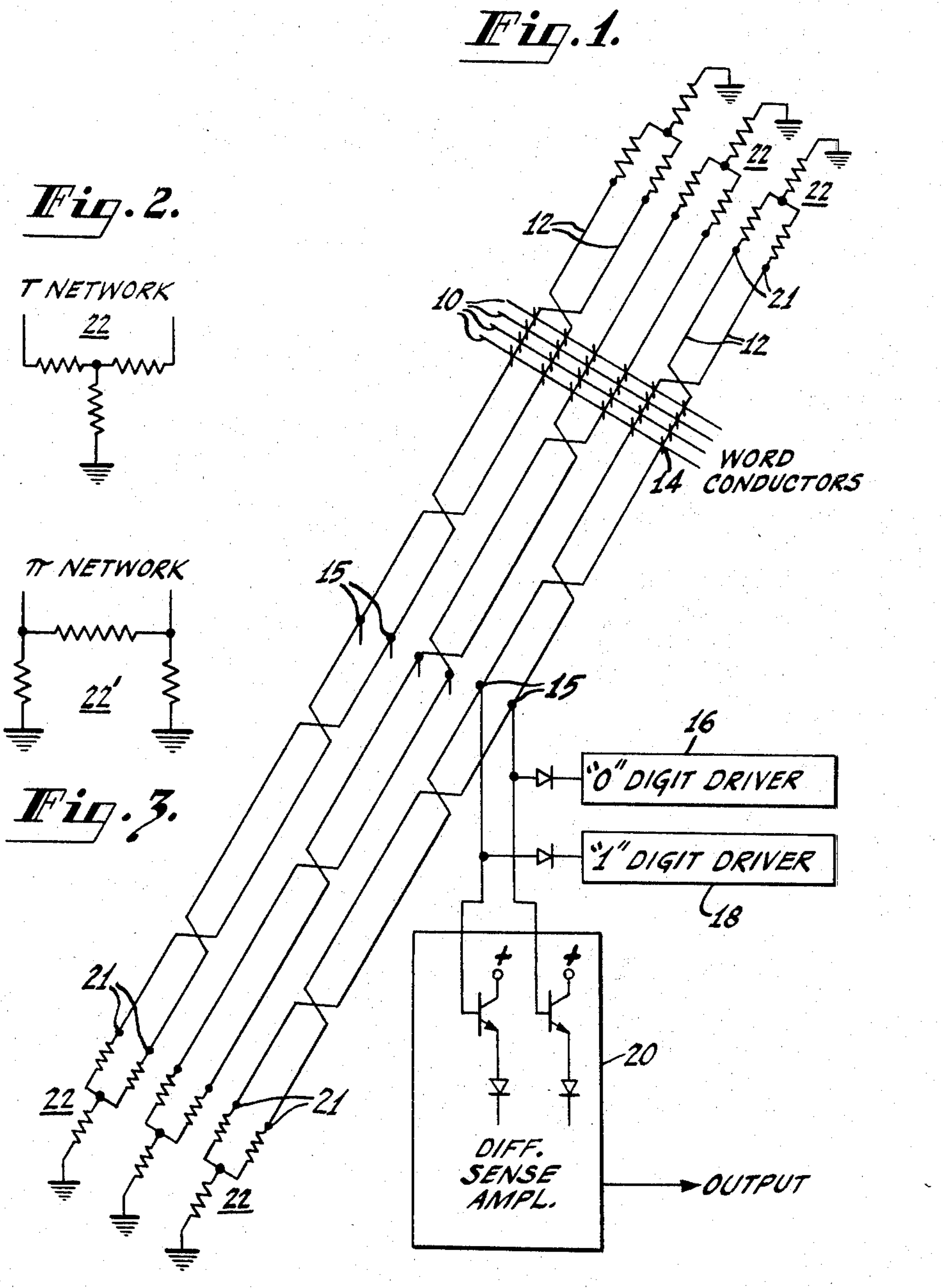
FIG. 1 is a fragmentary diagram of a magnetic memory constructed according to the teachings of the invention.
FIG. 2 is a diagram of a T network such as is included in the system of FIG. 1 for terminating digit-sense conductor pairs.
FIG. 3 is a diagram of a $\pi$ network which may be employed in place of the T network in the system of FIG. 1.

Referring now in greater detail to FIG. 1, there is shown a fragmentary part of a memory organization in which a large number of word conductors 10 extend in orthogonal relationship with a number of digit-sense conductor pairs 12. Magnetic core memory elements 14 are represented by diagonal lines at the crossovers of word conductors and digit-conductors.

The two conductors of each digit-conductor pair 12 are transposed periodically along the length of the pair. The transpositions of the conductors of a pair are staggered in relation to the transpositions of conductors of adjacent pairs. Terminals 15 are provided at the midpoints of each digit conductor pair for connection to a "0" digit driver 16, a "1" digit driver 18 and a differential sense amplifier 20. Additional circuits (not shown) like circuits 16, 18 and 20 are provided for each digit conductor pair 12. The impedances of the circuits 16, 18 and 20 presented to the terminals 15 of the digit pairs 12 are very high in relation to the characteristic impedance of the conductor pairs.

The terminal ends 21 of the digit conductor pairs 12 are connected to a point of reference potential such as ground through three-element, three-terminal terminating-impedance T networks 22. The T networks 22 are so-called because of their appearance when drawn as shown in FIG. 2. The T network 22 of FIG. 2 may be replaced by an equivalent $\pi$ network 22' as shown in FIG. 3. The electrical equivalence of T and $\pi$ networks, and the values of individual resistors providing complete equivalence, are described in "Communications Engineering" by W. L. Everitt, second edition, McGraw-Hill Book Co., Inc., 1937, at pp. 34 through 40.

The values of the three resistors in each terminating network are determined so that the network will constitute a proper energy absorbing termination for both differential-mode and common-mode signals on the respective digit conductor pair. Three resistors are required in each terminating network because the desired multiple-mode termination cannot be accomplished with only two resistors.

Figure 4A:
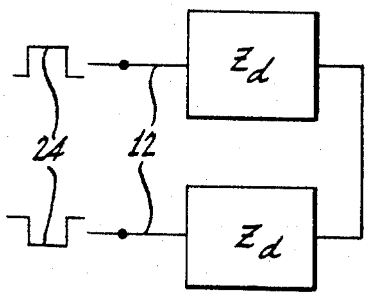
FIG. 4A is a diagram illustrating the termination of a conductor pair for differential-mode signals.

FIG. 4A illustrates a termination for a conductor pair 12 for differential-mode signals on the conductor pair. The signal to be terminated is represented by opposite polarity pulses 24 arriving at the termination. The differential-mode energy is absorbed without reflection when the two conductors of the pair are connected together through impedances each having a value $Z_d$. The value of each of the resistors $Z_d$ is determinable by well-known methods when the inductive and capacitive characteristics per unit length of the conductor pair 12 are known. These characteristics of the digit-conductor pairs 12 in the memory of FIG. 1 are difficult to measure. The values are affected by the spacing of the conductors of the digit-conductor pairs, the proximities of the word conductors 10 and the inductive effects of the magnetic cores 14. It is therefore more convenient to determine the values of the resistors $Z_d$ experimentally by varying the resistors until measured reflections are reduced to a minimum or negligible value.

Figure 4B:
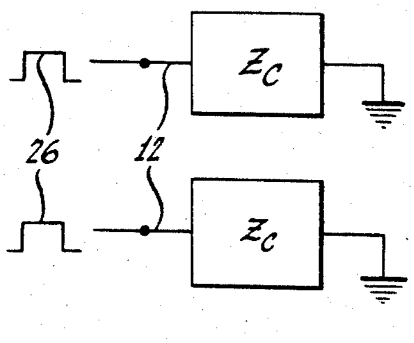
FIG. 4B is a diagram illustrating the termination of a conductor pair for common-mode signals.

FIG. 4B illustrates a termination for a conductor pair 12 that completely absorbs common-mode signals as represented by the two same-polarity pulses 26 on the two conductors of the pair 12. Each conductor is connected to ground through an impedance $Z_c$. The value of the impedance $Z_c$ which efficiently absorbs a common-code signal is also most conveniently determined by experimental methods.

Figure 4C:
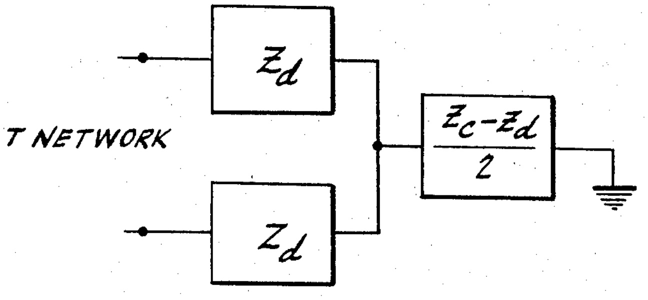
FIG. 4C is a diagram illustrating the termination of a conductor pair with a T network providing a proper termination for both differential-mode and common-mode signals.

After the values of impedances $Z_d$ and $Z_c$ are determined, it is possible, according to the teachings of the invention, to construct a three-element, three-terminal network capable of properly terminating both differential-mode signals and common-mode signals. FIG. 4C shows such a network in the T form including a third resistor having a value $$\frac{Z_c Z_d}{2}$$

Figure 4D:
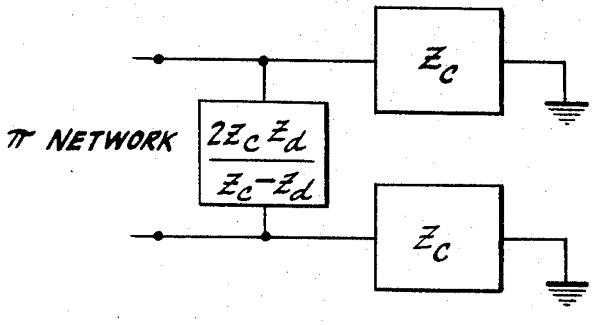
FIG. 4D is a diagram illustrating an alternative $\pi$ network termination for properly terminating both differential-mode and common-mode signals.

FIG. 4D shows an equivalent network in $\pi$ form including a third impedance having a value equal to $$\frac{2Z_c Z_d}{Z_c - Z_d}$$

The optimum values of the resistors in the networks of FIG. 4C and FIG. 4D cannot very well be determined solely by mathematical means but require some experimental varying of the values to determine the values most suitable for absorbing both differential-mode signals and common-mode signals. In determining the values of the resistors, special care should be taken to insure the termination of differential-mode signals because the differential sense amplifier 20 is sensitive to such signals. The amplifier is relatively insensitive to common-mode signals.

In the operation of the memory system of FIG. 1, writing is accomplished by energizing one of the word conductors 10 concurrently with the energization of a digit driver 16 where it is desired to write a "0" and a digit driver 18 where it is desired to write a "1". The usual word selection matrix used to energize a selected one of the word conductors 10 causes voltage transients on conductors 10 which are capacitively coupled to digit conductor pairs 12. Also, one conductor of each digit conductor pair receives a large digit pulse signal from a digit driver 16 or 18. This pulse is coupled as noise directly and through word conductors to other digit conductors.

The writing of information thus results in a complex noise condition in the entire memory. The noise disturbances on the digit conductor pairs include both common-mode components and differential-mode components. The subsequent reading of information from the memory cannot proceed until these modes of noise energy have been dissipated. The energies are dissipated, without reflections, in the terminating networks 22 at both ends of the digit conductor pairs.

In an actually-constructed, two-core-per-bit memory for storing 1024 words of 100 bits each, it was found that a read-write cycle time of about 450 nonoseconds could be achieved using T termination networks according to FIGS. 1, 2 and 4C. The values of the resistors in the networks were determined using calculated values of 137 ohms for $Z_d$ and 403 ohms for $Z_c$, giving a value of 133 ohms for $$\frac{Z_c - Z_d}{2}$$

What is claimed is:

1. A memory comprising
a plurality of word conductors,
a plurality of digit conductor pairs arranged transverse to said word conductors,
memory elements located at at least some of the cross-overs of word and digit conductors,
digit drivers and a differential sense amplifier coupled to each digit conductor pair, and
a plurality of three-element three-terminal impedance networks each having two terminals connected to ends of the conductors of a digit conductor pair and a third terminal connected to a point of reference potential, said networks having impedance values to provide terminations for both common-mode and differential-mode signals on the respective digit conductor pair.

2. A memory comprising
a plurality of word conductors,
a pluraltiy of digit conductor pairs arranged transverse to said word conductors, each pair of conductors having characteristics such that each conductor is properly terminated for the differential mode by an impedance $Z_d$ and is properly terminated for the common mode by an impedance $Z_c$.
memory elements located at at least some of the cross-overs of word and digit conductors,
digit drivers and a differential sense amplifier coupled to each digit conductor pair, and
a plurality of three-element three-terminal T resistor networks each having two resistors connected to the conductors of the pair and having a value equal to $Z_d$ and one resistor connected to a point of reference potential having a value equal to $$\frac{Z_c - Z_d}{2}$$

3. A memory comprising
a plurality of word conductors,
a plurality of digit conductor pairs arranged transverse to said word conductors, each pair of conductors having characteristics such that each conductor is properly terminated for the differential mode by an impedance $Z_d$ and is properly terminated for the common mode by an impedance $Z_c$,
memory elements located at at least some of the cross-overs of word and digit conductors,
digit drivers and a differential sense amplifier coupled to each digit conductor pair, and
a plurality of three-element three-terminal $\pi$ resistor networks each having two resistors connected to a point of reference potential and having a value equal to $Z_c$ and one resistor connected between the conductors of the pair having a value equal to $$\frac{2Z_c Z_c}{Z_c - Z_d}$$

4. A memory comprising
a plurality of word conductors,
a plurality of digit conductor pairs arranged transverse to said word conductors, the conductors of each digit conductor pair being transposed, the transpositions of one pair being staggered relative to transpositions of adjacent pairs, each pair of conductors having characteristics such that each conductor is properly terminated for the differential mode by an impedance $Z_d$ and is properly terminated for the common mode by an impedance $Z_c$,
memory elements located at at least some of the cross-overs of word and digit conductors,
digit drivers and a differential sense amplifier coupled to each digit conductor pair, and
a plurality of three-element three-terminal resistor networks each having two terminals connected to ends of the conductors of a digit conductor pair and a third terminal connected to ground, said networks having resistor values to provide terminations for both common-mode and differential-mode signals on the respective digit conductor pair.

5. A memory comprising
a plurality of word conductors,
a plurality of digit conductor pairs arranged transverse to said word conductors, the conductors of each digit conductor pair being transposed, the transpositions of one pair being staggered relative to transpositions of adjacent pairs, each pair of conductors having characteristics such that each conductor is properly terminated for the differential mode by an impedance $Z_d$ and is properly terminated for the common mode by an impedance $Z_c$,
memory elements located at at least some of the cross-overs of word and digit conductors,
digit drivers and a differential sense amplifier coupled to each digit conductor pair, and
a plurality of three-element three-terminal T resistor networks each having two terminals connected to ends of the conductors of a digit conductor pair and a third terminal connected to ground, said networks having resistor values to provide terminations for both common-mode and differential-mode signals on the respective digit conductor pair, said T network including two resistors connected to the conductors of the pair having a value equal to $Z_d$ and one resistor connected to ground having a value equal to $$\frac{Z_c - Z_d}{2}$$

6. A memory comprising a plurality of word conductors, a plurality of digit conductor pairs arranged transverse to said word conductors, the conductors of each digit conductor pair being transposed, the transpositions of one pair being staggered relative to transpositions of adjacent pairs, each pair of conductors having characteristics such that each conductor is properly terminated for the differential mode by an impedance $Z_d$ and is properly terminated for the common mode by an impedance $Z_c$, memory elements located at at least some of the crossovers of word and digit conductors, digit drivers and a differential sense amplifier coupled to each digit conductor pair, and a plurality of three-element three-terminal $\pi$ resistor networks each having two terminals connected to ends of the conductors of a digit conductor pair and a third terminal connected to ground, said networks having resistor values to provide terminations for both common-mode and differential-mode signals on the respective digit conductor pair, said $\pi$ network including two resistors connected to ground having a value equal to $Z_c$ and one resistor connected between the conductors of the pair having a value equal to $$\frac{2Z_cZ_d}{Z_c - Z_d}$$

References Cited

UNITED STATES PATENTS

| | | | |
|---|---|---|---|
| 3,305,846 | 2/1967 | Amemiya | 340—174 |
| 3,319,233 | 5/1967 | Amemiya et al. ______ | 340—174 |

BERNARD KONICK, *Primary Examiner.*

P. SPERBER, *Assistant Examiner.*